April 21, 1936.   C. I. McNEIL   2,038,187
ELECTRICAL APPARATUS
Filed Oct. 9, 1934
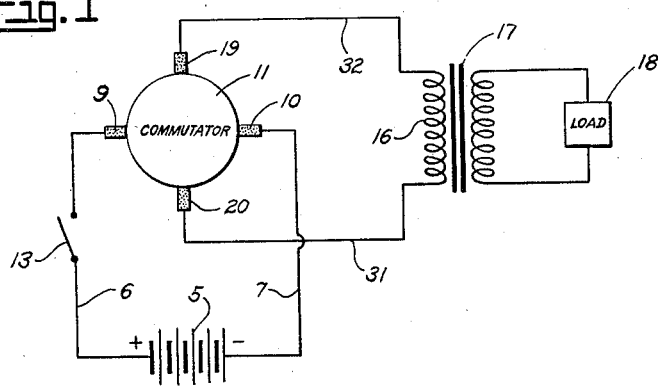
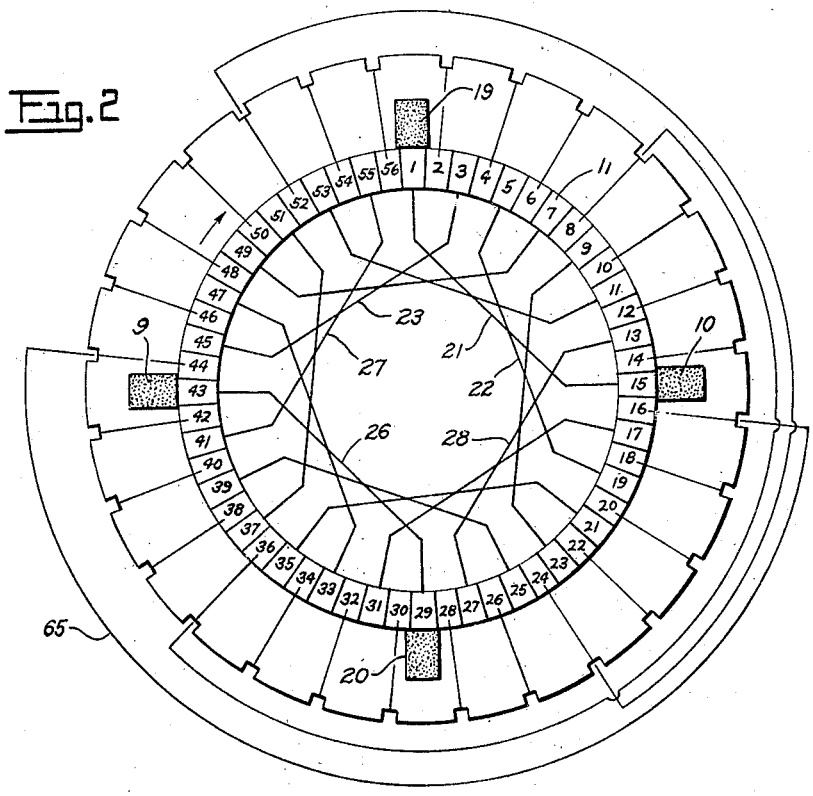
INVENTOR.
Charles I. McNeil
BY
ATTORNEY.

Patented Apr. 21, 1936

2,038,187

UNITED STATES PATENT OFFICE 2,038,187

ELECTRICAL APPARATUS

Charles I. McNeil, Bloomfield, N. J., assignor to Eclipse Aviation Corporation, East Orange, N. J., a corporation of New Jersey Application October 9, 1934, Serial No. 747,609

5 Claims. (Cl. 175—364)

This invention is directed to the problem of converting direct current to alternating current and the ultimate object is to provide a novel method and means for effecting such a conversion.

It is believed that heretofore most current converters of the rotary type have involved the use of at least two commutators or some equivalent thereof, such as collector rings. Moreover, most of the rotary converters of the prior art involve the use of a plurality of armatures, or at least a compound armature having a plurality of separately energized windings. The present invention distinguishes from these prior art systems in that the novel method herein disclosed may be carried into practice by the use of only a single commutator and a single armature of conventional construction, having only a single winding connecting with the commutator.

In the drawing there is shown schematically a dynamo electric machine and connections thereto which constitute one embodiment of the invention and wherein Fig. 1 is a schematic diagram of the complete set of external electrical connections, while Fig. 2 shows certain of the connections within the commutator, the commutator and armature being also shown diagrammatically in Fig. 2 with the commutator brushes and armature slots shown in their relation to the commutator and to each other.

Referring to the drawing, a suitable source of direct current is indicated by reference character 5 and connections 6 and 7 are indicated as the means for electrically connecting the source 5 with the brushes 9 and 10 adapted to engage the commutator 11 of a dynamo electric machine which may be a conventional direct current motor having the usual stationary field or fields and a rotatable armature on which conductors (a few being shown diagrammatically in Fig. 2) are wound and the ends thereof secured to diametrically opposed segments of the commutator so as to permit the completion of a circuit from the source 5 by way of the conductor 6, control switch 13, brush 9, the armature winding, and then back to the commutator segment and brush 10, then conductor 7 to return to the source 5.

As above suggested, the present invention involves a novel method of utilizing the conventional commutator 11 as the means for converting the direct current above described, or at least a portion of said current, into alternating current which may be taken from the machine by way of any suitable connections and delivered to the primary winding 16 of a set-up transformer 17 to supply an alternating current load of any character such as indicated diagrammatically at 18. In the embodiment shown, the novel method of conversion is carried out by the use of a second pair of commutator brushes 19 and 20 spaced midway between the brushes 9 and 10 and in diametrically opposite positions, and in conjunction with these additional brushes 19 and 20 there is provided a set of current conducting leads or jumpers each of which connects a segment of the commutator with another segment separated therefrom by an angular distance corresponding to the angular distance between the direct current input brushes and alternating current delivery brushes—which angular distance is, of course, 90° when only four brushes are employed, as shown. The spacing will, of course, vary with the number of brushes employed, and the number of jumpers required will, of course, vary with the number of commutator segments employed. As shown in Fig. 2 there are assumed to be 56 segments on the commutator of equal size and spacing and insulated from each other in the usual manner. With this number of segments the number of jumpers used will be fourteen or one-quarter the number of segments, and every fourth segment will connect with a segment which is fourteen units removed therefrom in the advance direction while every segment disposed midway between those above described will be connected with a segment which is fourteen units removed therefrom in the reverse direction. Thus, for example, segment 1 will be connected with segment 15 as by means of the jumper indicated by 21 in Fig. 2; segment 5 will be connected with segment 19 as indicated by jumper 22, while segment 3 will be connected with a segment fourteen units therefrom in the reverse direction— that is, segment 45—as indicated by jumper 23. With this arrangement it will be evident that upon passage of current from the source 5 through the brush 9 to segments 43 and 44 said current will flow not only through segment 44 and armature loop 65 to return to the battery by way of the opposite segment 16 and the brush 10; it will also flow from said segment 43 to the segment 29 by way of jumper 26 and from said segment 29 the current will be delivered to the alternating current winding 16 and the transformer, the current passing by way of brush 20 and conductor 31 and returning to the source 5 by way of conductor 32, brush 19, segment 1, jumper 21, segment 15, brush 10, and conductor 7. At the next instant, or that is when the rotation of the armature has proceeded sufficiently to bring segment 41 in registry with brush 9, that portion of the current which is shunted to the coil 16 will now pass to said coil in the reverse direction—that is, its path will be from brush 9 and segment 41 to segment 55 by way of jumper 27, and from segment 55 the current will pass to the coil by way of brush 19 and conductor 32, the circuit then being completed by way of conductor 31, brush 20, segment 27 (which will now be in registry with the brush 20), jumper 28, segment 13 (now in registry with brush 10) and back to the source 5 by way of the conductor 7. It will thus be seen that the direction of the flow of current to the coil 16 will reverse once for each passage of a pair of segments under a given brush of the commutator, or in other words, there will be a complete alternating current cycle for every four segments passing a brush, and with the arrangement shown this will mean fourteen complete cycles of alternating current for each revolution of the armature.

If the use of a complete motor is not desired, the commutator may be used alone, and rotated manually or otherwise. Other changes may be made within the scope of the appended claims.

What is claimed is:

1. Means for converting direct to alternating current comprising, in combination with a source of direct current and an alternating current outlet, a dynamo electric machine having an armature winding including the usual plurality of looped conductors, a commutator having a segment connected to each end of each armature loop, a plurality of brushes engageable with said commutator, two of said brushes being connected with opposite poles of said direct current source, and two being connected with said alternating current outlet, and means for causing a portion of the current which would otherwise flow through said armature loops, to flow in opposite directions alternately through said last-named brushes and said outlet in series, said last named means including jumper connections between certain of said segments corresponding in spacing to the spacing of said brushes.

2. Means for converting direct to alternating current comprising, in combination with a source of direct current and an alternating current outlet, a dynamo electric machine having an armature winding including the usual plurality of looped conductors, and means for causing a portion of the current which would otherwise flow through said armature loops, to flow in opposite directions alternately through said outlet in series, said last named means including jumper connections between certain of said segments corresponding in spacing to the spacing of said brushes.

3. Means for converting direct to alternating current comprising, in combination with a source of direct current and an alternating current outlet, a commutator having a plurality of segments, each insulated from the adjacent, a plurality of brushes engageable with said commutator, two of said brushes being connected with opposite poles of said direct current source, and two being connected with said alternating current outlet, and means for causing a portion of the current to flow in opposite directions alternately through said last-named brushes and said outlet in series, said last named means including jumper connections between certain of said segments corresponding in spacing to the spacing of said brushes.

4. Means for converting direct to alternating current comprising, in combination with a source of direct current and an alternating current outlet, a dynamo electric machine having an armature winding including the usual plurality of looped conductors, a commutator having a segment connected to each end of each armature loop, a plurality of brushes engageable with said commutator, two of said brushes being connected with opposite poles of said direct current source, and two being connected with said alternating current outlet, and means for causing a portion of the current which would otherwise flow through said armature loops, to flow in opposite directions alternately through said last-named brushes and said outlet in series.

5. Means for converting direct to alternating current comprising, in combination with a source of direct current and an alternating current outlet, a commutator having a plurality of segments, each insulated from the adjacent, a plurality of brushes engageable with said commutator, two of said brushes being connected with opposite poles of said direct current source, and two being connected with said alternating current outlet, and means for causing a portion of the current to flow in opposite directions alternately through said last-named brushes and said outlet in series.

CHARLES I. McNEIL.